(12) United States Patent
Niiho et al.

(10) Patent No.: US 7,630,643 B2
(45) Date of Patent: Dec. 8, 2009

(54) MULTIMODE OPTICAL TRANSMISSION SYSTEM AND MULTIMODE OPTICAL TRANSMISSION METHOD

(75) Inventors: Tsutomu Niiho, Osaka (JP); Kouichi Masuda, Osaka (JP)

(73) Assignee: Panasonic Corporation, Osaka (JP)

(*) Notice: Subject to any disclaimer, the term of this patent is extended or adjusted under 35 U.S.C. 154(b) by 544 days.

(21) Appl. No.: 10/585,320

(22) PCT Filed: Jul. 25, 2005

(86) PCT No.: PCT/JP2005/013572

§ 371 (c)(1),
(2), (4) Date: Jul. 6, 2006

(87) PCT Pub. No.: WO2006/013745

PCT Pub. Date: Feb. 9, 2006

(65) Prior Publication Data
US 2009/0016724 A1    Jan. 15, 2009

(30) Foreign Application Priority Data
Aug. 5, 2004    (JP)    ............................. 2004-229215

(51) Int. Cl.
*H04J 14/02*    (2006.01)
(52) U.S. Cl. ............................. 398/79; 398/82; 398/84; 398/87; 398/91
(58) Field of Classification Search .................... 398/79, 398/84, 87, 91, 92, 43
See application file for complete search history.

(56) References Cited
U.S. PATENT DOCUMENTS
5,063,559 A * 11/1991 Marcuse ...................... 398/91
(Continued)

FOREIGN PATENT DOCUMENTS
JP    08-122586    5/1996
(Continued)

OTHER PUBLICATIONS
Tetsuya Miki et al., "Handbook of Optical Communication Technology", The Optronics Co., Ltd., pp. 199-201, 2002 (ISBN 4-900474-91-6).
(Continued)

*Primary Examiner*—Ken N Vanderpuye
*Assistant Examiner*—Hibret A Woldekidan
(74) *Attorney, Agent, or Firm*—Wenderoth, Lind & Ponack, L.L.P.

(57) ABSTRACT

Provided is a multimode optical transmission system capable of reducing an influence of multimode dispersion occurring when an optical signal is transmitted in multimode. Light sources (101 to 10*m*) respectively convert inputted electrical signals into a plurality of optical signals respectively having different wavelengths, and respectively output the plurality of optical signals. A wavelength multiplexing section (200) performs wavelength multiplexing of the plurality of optical signals outputted from the light sources (101 to 10*m*), and outputs a resultant signal as a wavelength multiplexed signal. A multimode optical transmission path (300) optically transmits the wavelength multiplexed signal in multimode. A mode processing section (400) extracts, from the wavelength multiplexed signal transmitted through the multimode optical transmission path (300), a plurality of optical signals each being in a mode having a particular wavelength and a particular propagation constant. Optical receiving sections (501 to 50*m*) receive the plurality of optical signals having been extracted, and convert the received optical signals into electrical signals.

15 Claims, 9 Drawing Sheets

U.S. PATENT DOCUMENTS

| | | | | |
|---|---|---|---|---|
| 5,099,114 | A * | 3/1992 | Matsumoto et al. | 250/227.23 |
| 5,608,825 | A * | 3/1997 | Ip | 385/24 |
| 6,282,005 | B1 * | 8/2001 | Thompson et al. | 398/143 |
| 6,525,853 | B1 * | 2/2003 | Stuart | 398/115 |
| 6,876,793 | B1 * | 4/2005 | Ling et al. | 385/37 |
| 2002/0105704 | A1 | 8/2002 | Numata et al. | |
| 2004/0105675 | A1 * | 6/2004 | Beacken | 398/49 |
| 2006/0013527 | A1 * | 1/2006 | Morel et al. | 385/24 |

FOREIGN PATENT DOCUMENTS

| | | |
|---|---|---|
| JP | 10-227935 | 8/1998 |
| JP | 10-239566 | 9/1998 |
| JP | 2002-228895 | 8/2002 |

OTHER PUBLICATIONS

Katsunari Okamoto, "Fundamentals of Optical Waveguides", Corona Publishing Co., Ltd., p. 83, Fig. 3.12, 1992 (ISBN 4-339-00602-5).

* cited by examiner

F I G. 1
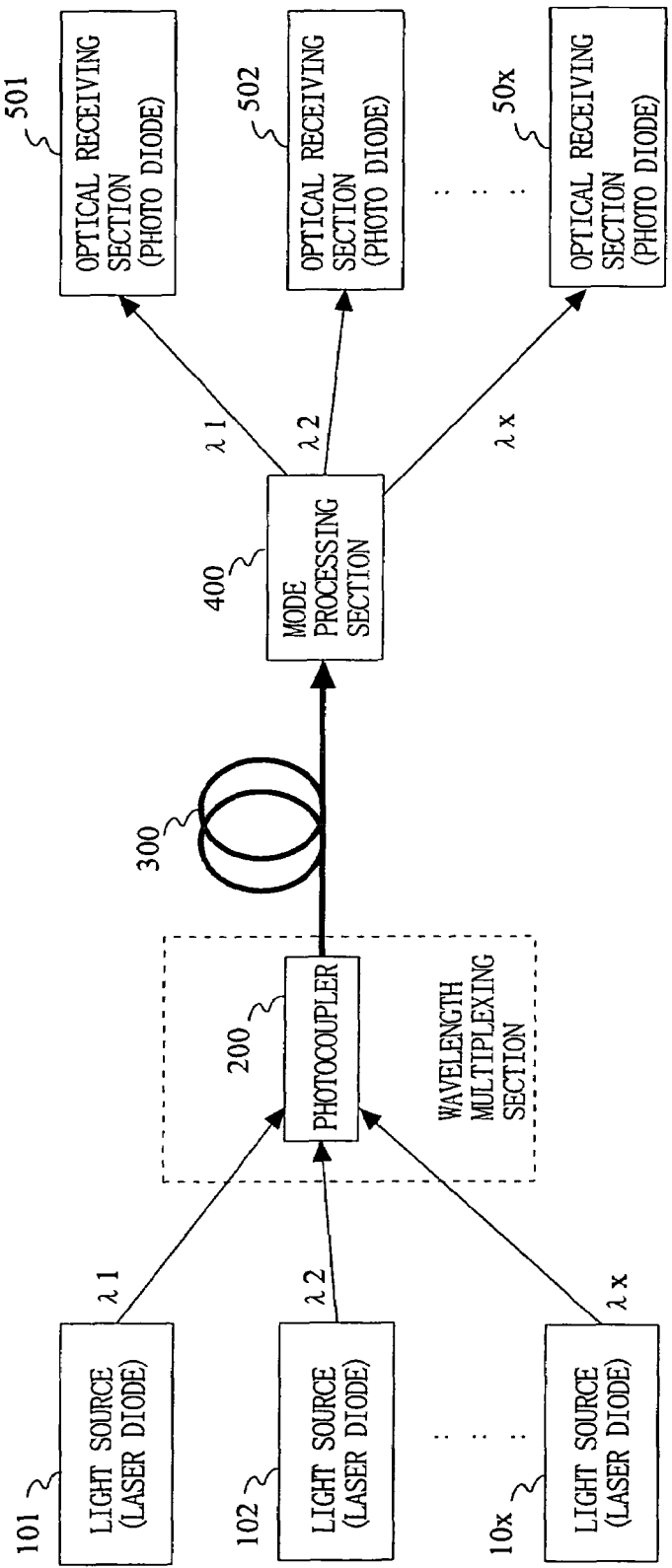

(a) INPUT SIGNAL (b) OUTPUT SIGNAL

MULTIMODE OPTICAL TRANSMISSION SYSTEM AND MULTIMODE OPTICAL TRANSMISSION METHOD

TECHNICAL FIELD

The present invention relates to a multimode optical transmission system and a multimode optical transmission method for transmitting an optical signal in multimode, and particularly to a multimode optical transmission system and a multimode optical transmission method which are capable of reducing a deterioration of a quality of an optical transmission, the deterioration being caused by multimode dispersion occurring when the optical signal is transmitted in multimode.

BACKGROUND ART

FIG. 9 is a block diagram showing a structure of a conventional multimode optical transmission system. In FIG. 9, the conventional multimode optical transmission system comprises a laser diode 901, a photo diode 902 and a multimode optical transmission path 903. The laser diode 901 converts an inputted electrical signal into an optical signal, and then outputs the optical signal to the multimode optical transmission path 903. The multimode optical transmission path 903 transmits the optical signal outputted from the laser diode 901 to the photo diode 902. The photo diode 902 converts the inputted optical signal into an electrical signal.

In more detail, a multimode optical fiber is used as the multimode optical transmission path 903. The optical signal having a single wavelength $\lambda$, which is outputted from the laser diode 901, is inputted into the multimode optical fiber. Since a core diameter of the multimode optical fiber is greater than that of a single mode optical fiber, there exist a plurality of propagation paths of the optical signal within the multimode optical fiber. In general, a multimode optical fiber has a core diameter of approximately 50 μm, whereas a single mode optical fiber has a core diameter of approximately 10 μm.

Here, each of optical signals respectively having different propagation paths is referred to as a mode. A mode having a smallest angle of incidence on an optical fiber is a fundamental mode. A transmission distance of an optical signal is shortest when the optical signal is in the fundamental mode. As an order of the mode becomes greater, the angle of incidence on the optical fiber also becomes greater, and a propagation distance of the optical signal becomes longer. Assuming that a longitudinal direction of the optical fiber is a Z-axis, a Z-axis component of a wave number k is referred to as a propagation constant $\beta$, and an equation $\beta = k \cos \phi$ is satisfied. Here, an angle of the optical signal with respect to the Z-axis is $\phi$. Accordingly, each mode of an optical signal has a different propagation constant, and the fundamental mode has a largest propagation constant. Here, an optical signal having all modes is inputted into the photo diode 902. The photo diode 902 converts the inputted optical signal having all the modes into an electrical signal.

In a system using the multimode optical fiber (i.e., the multimode optical transmission system), since the core diameter of the multimode optical fiber is large, a highly precise connection is not required between the multimode optical fiber and each of peripheral parts such as the laser diode 901 and the photo diode 902. As a result, the multimode optical transmission system can be constructed at a lower cost compared with a system using a single mode optical fiber (i.e., a single mode optical transmission system). For this reason, the multimode optical transmission system is currently in widespread use for a system such as an office LAN for transmitting an optical signal within a relatively short distance (refer to a non-patent document 1).

[Non-Patent Document 1] Tetsuya Miki, et al., "Handbook of Optical Communication Technology", The Optronics Co., Ltd., pp. 199 to pp. 201, 2002 (ISBN 4-900474-91-6).

[Non-Patent Document 2] Katsunari Okamoto, "Fundamentals of Optical Waveguides", Corona Publishing Co., Ltd., p 83, FIG. 3.12, 1992 (ISBN 4-339-00602-5).

DISCLOSURE OF THE INVENTION

Problems to be Solved by the Invention

However, it is well known that in the conventional multimode optical transmission system, a plurality of modes included in an optical signal propagating through the multimode optical fiber negatively affect a quality of transmission of an the optical signal since each of the modes included in the optical signal has a different group delay time (refer to the non-patent document 2). FIG. 10 is a diagram illustrating a relationship between an input signal and an output signal in the conventional multimode optical transmission system. In the case where such a signal as shown in FIG. 10($a$) is inputted into the laser diode 901, the signal outputted from the photo diode 902 becomes a signal having such a widened waveform as shown in FIG. 10($b$). This phenomenon is called "multimode dispersion". The multimode dispersion causes crosstalk and waveform deterioration when a high-speed transmission is performed using the multimode optical fiber.

Therefore, an object of the present invention is to provide a multimode optical transmission system which is capable of, when an optical signal is transmitted by using the multimode optical transmission path, reducing such negative effects caused by the multimode dispersion.

Solution to the Problems

The present invention is directed to a multimode optical transmission system for converting inputted electrical signals into optical signals, and performing multimode optical transmissions of the optical signals. In order to achieve such an object, the multimode optical transmission system comprises: a plurality of light sources, a wavelength multiplexing section, a multimode optical transmission path, a plurality of optical signal extraction sections, and a plurality of optical receiving sections. The plurality of light sources respectively convert the electrical signals into a plurality of optical signals respectively having different wavelengths, and respectively output the plurality of optical signals. The wavelength multiplexing section performs wavelength multiplexing of the plurality of optical signals outputted from the plurality of light sources, and outputs a resultant signal as a wavelength multiplexed signal. The multimode optical transmission path optically transmits in multimode the wavelength multiplexed signal outputted from the wavelength multiplexing section. The plurality of optical signal extraction sections respectively extract, from the wavelength multiplexed signal transmitted on the multimode optical transmission path, optical signals each having a mode having a particular wavelength and a particular propagation constant. The plurality of optical receiving sections respectively receive the optical signals extracted by the plurality of optical signal extraction sections, and respectively convert the received optical signals into a plurality of electrical signals. Note that, the wavelengths of the plurality of optical signals outputted from the plurality of light sources are set, such that a propagation constant of a fundamental mode of an optical signal outputted from each light source and a propagation constant of a high order mode of an optical signal outputted from any other light source are different from each other.

Preferably, the plurality of optical signal extraction sections each include: an optical reflection section for reflecting a corresponding one of the optical signals each having the mode having the particular wavelength and the particular propagation constant; and a reflected optical signal extraction section for extracting the optical signal reflected by the optical reflection section.

The plurality of optical signal extraction sections each may include: a plurality of optical reflection sections for respectively reflecting optical signals each having a mode having a particular wavelength and a particular propagation constant; a plurality of reflected optical signal extraction sections for respectively extracting the optical signals reflected by the plurality of optical reflection sections; a plurality of optical delay sections for respectively adding appropriate delays to the optical signals extracted by the plurality of reflected optical signal extraction sections; and a multiplexing section for multiplexing the optical signals respectively outputted via the plurality of optical delay sections.

The plurality of optical signal extraction sections each may be an optical filter for transmitting a corresponding one of the optical signals each having the mode having the particular wavelength and the particular propagation constant, and reflecting any other optical signals. Alternatively, the plurality of optical signal extraction sections each may include: a plurality of optical filters for respectively transmitting optical signals each having a mode having a particular wavelength and a particular propagation constant, and reflecting any other optical signals; a plurality of optical delay sections for respectively adding appropriate delays to the optical signals transmitted through the plurality of optical filters; and a multiplexing section for multiplexing the optical signals respectively outputted via the plurality of optical delay sections.

The multimode optical transmission path is a multimode optical fiber. Alternatively, the multimode optical transmission path may be a single mode optical fiber. Note that, a wavelength of an optical signal propagating through the single mode optical fiber is to be smaller than a cutoff frequency of the single mode optical fiber. Alternatively, the multimode optical transmission path may be a free space having a plurality of transmission paths.

The optical reflection section is a Fiber Bragg Grating. Alternatively, the optical reflection section may be an optical filter for transmitting a corresponding one of the optical signals each having the mode having the particular wavelength and the particular propagation constant, and reflecting any other optical signals. The reflected optical signal extraction section is an optical circulator. Alternatively, the reflected optical signal extraction section is a photocoupler.

The plurality of optical delay sections each are an optical waveguide. Alternatively, the plurality of optical delay sections each may adjust a delay amount by changing a refractive index of an optical transmission path.

The present invention is also directed to a multimode optical transmission method for converting inputted electrical signals into optical signals, and performing multimode optical transmissions of the optical signals. In order to achieve such an object, the multimode optical transmission method comprises: a light outputting step of, by using a plurality of light sources, converting the electrical signals into a plurality of optical signals respectively having different wavelengths, and outputting the plurality of optical signals; a wavelength multiplexing step of performing wavelength multiplexing of the plurality of optical signals outputted at the light outputting step, and outputting a resultant signal as a wavelength multiplexed signal; an optical transmission step of, via a multimode optical transmission path, optically transmitting in multimode the wavelength multiplexed signal outputted at the wavelength multiplexing step; an optical signal extracting step of extracting, from the wavelength multiplexed signal transmitted via the multimode optical transmission path, a plurality of optical signals each having a plurality of modes each having a particular wavelength and a particular propagation constant; and a light receiving step of receiving the plurality of optical signals extracted at the optical signal extracting step, and converting the received optical signals into a plurality of electrical signals. Note that, the wavelengths of the optical signals outputted at the light outputting step are set, such that a propagation constant of a fundamental mode of an optical signal outputted from each light source and a propagation constant of a high order mode of an optical signal outputted from any other light source are different from each other.

EFFECT OF THE INVENTION

According to the present invention, only an optical signal in a particular mode can be extracted from an optical signal having a plurality of modes. This reduces a deterioration of a quality of an optical transmission, which is caused by multimode dispersion occurring when square-law detection is performed on the optical signal having the plurality of modes. Further, a deterioration of a reception signal caused by cross talk can be prevented by setting wavelengths of optical signals respectively outputted from a plurality of light sources, such that a propagation constant of a fundamental mode of an optical signal outputted from each light source and a propagation constant of a high order mode of an optical signal outputted from any other light source do not coincide with each other.

Moreover, in the present invention, each of optical signal extraction sections includes a plurality of optical reflection sections, a plurality of reflected optical signal extraction sections and a plurality of optical delay sections. For this reason, each of a plurality of optical receiving sections can collectively perform square-low detection on optical signals respectively being in a plurality of modes each having a same amount of total propagation delay. Consequently, the optical transmission system according to an embodiment of the present invention not only reduces the deterioration of the quality of the optical transmission caused by multimode dispersion, but also minimizes optical transmission loss resulting from a mode extraction.

BRIEF DESCRIPTION OF THE DRAWINGS

FIG. 1 is a block diagram showing a fundamental structure of a multimode optical transmission system according to a first embodiment of the present invention.

Figure 2:
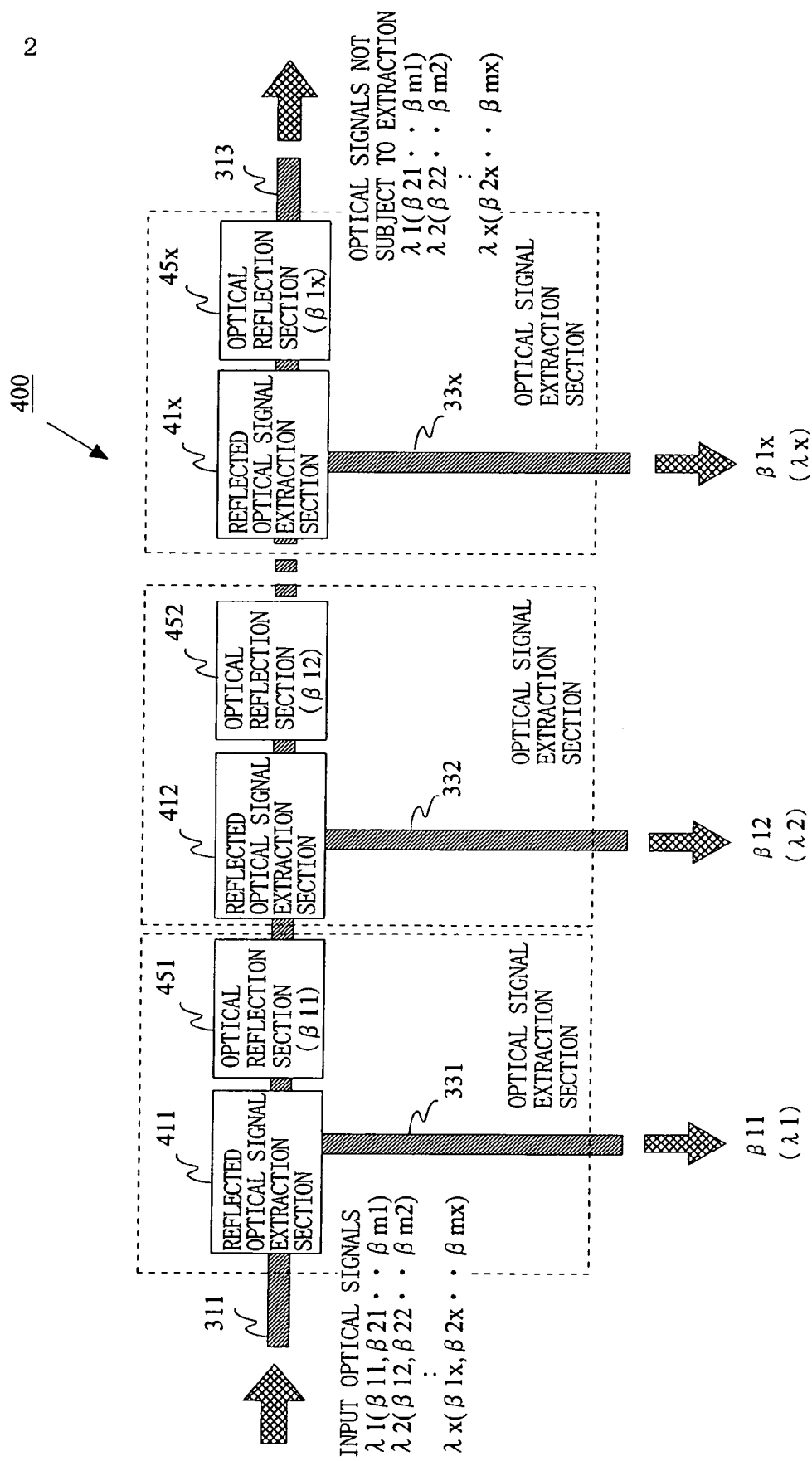
FIG. 2 is a block diagram showing a schematic structure of a mode processing section 400 according to the first embodiment of the present invention.

DESCRIPTION OF THE REFERENCE CHARACTERS 101 to 10x light sources (laser diodes)
200 photocoupler
300 multimode optical transmission path
311, 313 optical transmission paths
311a, 313a MMFs
331 to 33x output optical transmission paths
331a to 33xa MMFs
400, 420 mode processing sections
411 to 41x, 431 to 43m reflected optical signal extraction sections
411a to 41xa, 431a to 43ma circulators
421 to 42x optical signal extraction sections
441 multiplexing section
441a photocoupler
451 to 45x, 461 to 46m optical reflection sections
451a to 45xa, 461a to 46ma FBGs
471 to 47m optical delay sections
471a to 47ma optical delay lines
501 to 50x optical receiving sections (photo diodes)

BEST MODE FOR CARRYING OUT THE INVENTION

Hereinafter, embodiments of the present invention will be described with reference to the drawings.

First Embodiment

FIG. 1 is a block diagram showing a fundamental structure of a multimode optical transmission system according to a first embodiment of the present invention. In FIG. 1, the multimode optical transmission system comprises a plurality of light sources 101 to 10x, a photocoupler 200, a multimode optical transmission path 300, a mode processing section 400 and a plurality of optical receiving sections 501 to 50x. Note that, laser diodes may be used as the light sources 101 to 10x, and photo diodes may be used as the optical receiving sections 501 to 50x.

The laser diodes 101 to 10x respectively convert inputted electrical signals into optical signals respectively having wavelengths λ1 to λx. The optical signals respectively outputted from the laser diodes 101 to 10x are inputted into the photocoupler 200. The photocoupler 200 performs wavelength multiplexing of the inputted optical signals, and outputs a resultant signal as a wavelength multiplexed signal. Note that, since the photocoupler 200 performs wavelength multiplexing of the optical signals, the photocoupler 200 may be referred to as a wavelength multiplexing section. The wavelength multiplexed signal is propagated through the multimode optical transmission path 300, and then inputted into the mode processing section 400. The mode processing section 400 extracts, from the wavelength multiplexed signal, a plurality of optical signals each being in a mode having a particular propagation constant. The optical signals extracted by the mode processing section 400 are inputted into the photo diodes 501 to 50x, respectively. The photo diodes 501 to 50x respectively perform square-law detection on the inputted optical signals, and convert the optical signals into electrical signals.

Here, the mode processing section 400 is described in detail with reference to FIGS. 2 and 3. FIG. 2 is a block diagram showing a schematic structure of the mode processing section 400 according to the first embodiment of the present invention. In FIG. 2, the mode processing section 400 includes reflected optical signal extraction sections 411 to 41x, optical reflection sections 451 to 45x, an input optical transmission path 311, an output optical transmission path 313 and output optical transmission paths 331 to 33x. Here, since the reflected optical signal extraction section 41x and the optical reflection section 45x are for extracting the optical signal having the wavelength λx, the reflected optical signal extraction section 41x and the optical reflection section 45x may be collectively referred to as an optical signal extraction section. The optical signal extraction section may include, instead of the reflected optical signal extraction section 41x and the optical reflection section 45x, an optical filter for transmitting an optical signal being in a mode having a particular wavelength and a particular propagation constant, and reflecting any other optical signals.

Figure 3:
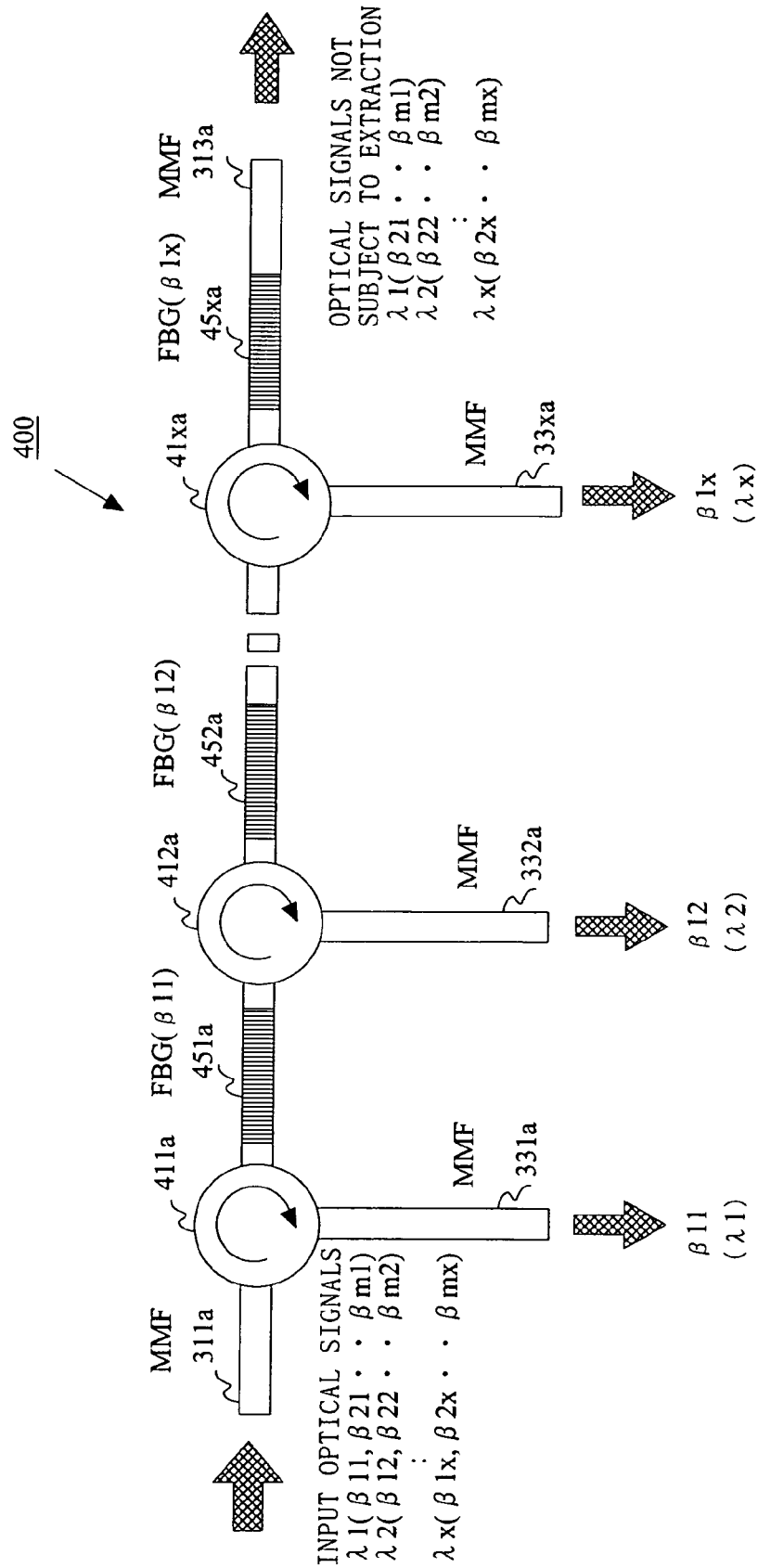
FIG. 3 is a block diagram showing a detailed exemplary structure of the mode processing section 400 according to the first embodiment of the present invention.

FIG. 3 is a block diagram showing a detailed structural example of the mode processing section 400 according to the first embodiment of the present invention. In FIG. 3, the mode processing section 400 illustratively includes: circulators 411a to 41xa as the reflected optical signal extraction sections 411 to 41x; FBGs (Fiber Bragg Gratings) 451a to 45xa as the optical reflection sections 451 to 45x; a MMF (Multimode Optical Fiber) 311a as the input optical transmission path 311; a MMF 313a as an output optical transmission path 313; and MMFs 331a to 33xa as the output optical transmission paths 331 to 33x.

With reference to FIG. 3, the optical signals (i.e., the wavelength multiplexed signal) inputted into the MMF 311a are inputted into the FBG 451a via the circulator 411a. The FBG 451a reflects an optical signal being in a mode having a particular propagation constant β11, and transmits the other optical signals. The reflected optical signal being in a mode having the propagation constant β11 is inputted into the MMF 331a via the circulator 411a. Similarly, optical signals respectively being in modes respectively having propagation constants β12 to β1x are respectively reflected by the FBGs 452a to 45xa, and respectively inputted into the MMFs 332a to 33xa, respectively via the circulators 412a to 41xa. In other words, by setting the propagation constants β11 to β1x of the optical signals respectively reflected by the FBGs 451a to 45xa as propagation constants of fundamental modes of the wavelengths λ1 to λx, the mode processing section 400 extracts, from the wavelength multiplexed signal, only optical signals respectively being in the fundamental modes respectively having the wavelengths λ1 to λx.

Figure 4:
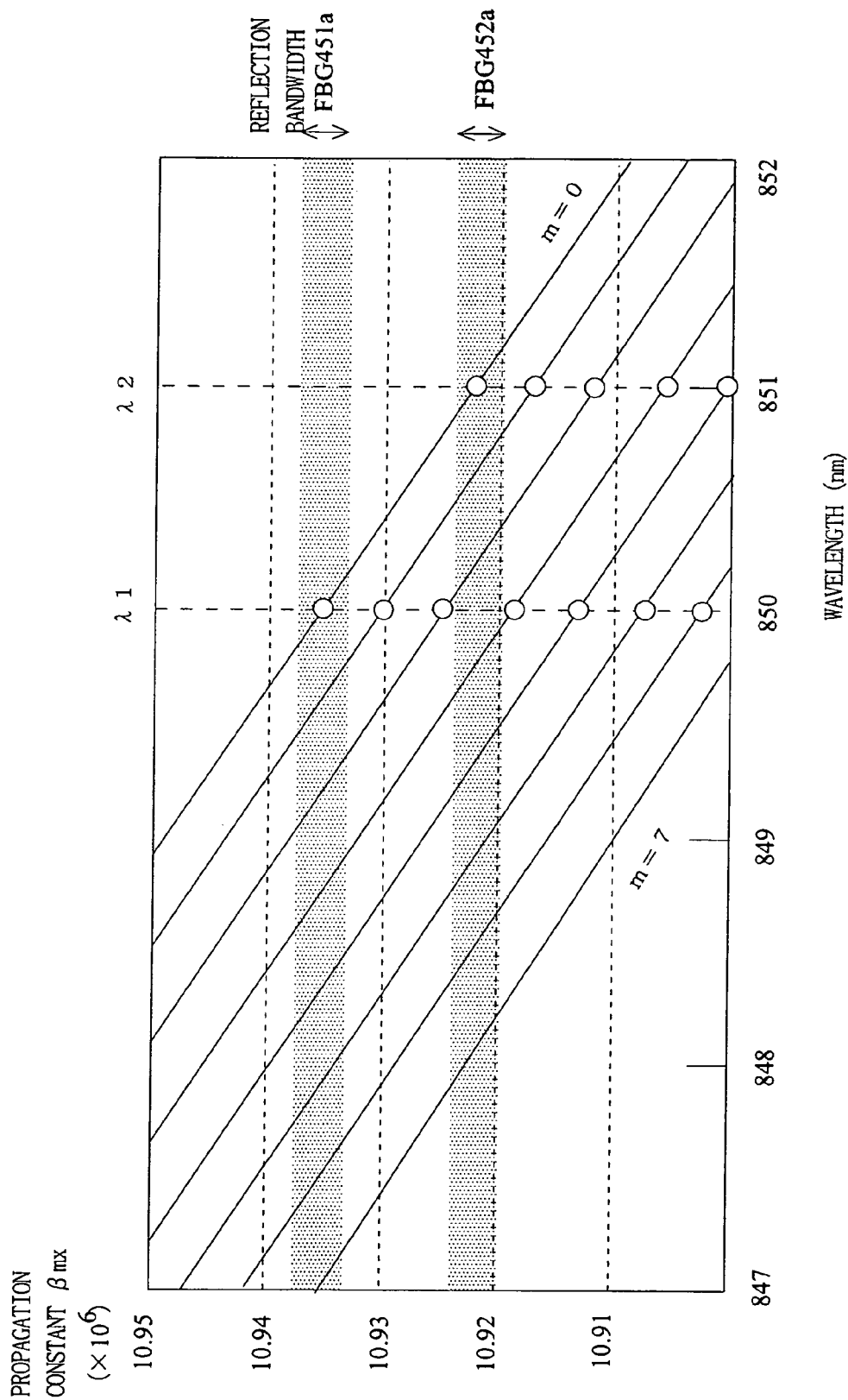
FIG. 4 shows a relationship between each of the two wavelengths of optical signals propagating through a MMF and propagation constants ($\beta$).

FIG. 4 is a diagram showing a relationship between each of wavelengths of optical signals propagating through a MMF and a propagation constant βmx. Here, operations of the mode processing section 400, in the case where the mode processing section 400 extracts the optical signals respectively being in the fundamental modes respectively having the wavelengths λ1 and λ2, are described in detail with reference to FIG. 4. FIG. 4 shows, with respect to each of the optical signals having the wavelengths λ1 and λ2, results of calculating propagation constants from a fundamental mode (m=0) to a seventh high-order mode (m=7). For these calculations, a graded index type optical fiber having a square refractive index distribution, a core diameter of 50 μm and NA of 0.2 are used as parameters of the MMF. As shown in FIG. 4, in the case where an optical signal having the wavelength λ1 (850 nm) is optically transmitted through the MMF, the propagation constant β11 of the fundamental mode of the optical signal is approximately 10935000 (1/m). The higher the order of the mode, the smaller is the propagation constant.

With reference to FIG. 4, the optical signals having the wavelengths λ1 and λ2, each of which has a plurality of modes, are inputted into the FBG 451a, via the MMF 311a and the circulator 411a. The FBG 451a reflects only an optical signal being in a mode having a propagation constant satisfying an equation βFBG=π/Λ. Here, Λ represents a perturbation cycle (index of refraction gradient) of the FBG 451a. Appropriately selecting the perturbation cycle allows the FBG 451a to reflect an optical signal having an arbitrary propagation constant (i.e., optical signal being in an arbitrary mode). For example, if the perturbation cycle is set to β1=β$_{FBG}$, FBG 451a reflects only an optical signal being in the fundamental mode having the wavelength λ1.

However, since the FBG 451a reflects all optical signals having the particular propagation constant β11, if an optical signal being in a high order mode having a wavelength different from λ1 has the propagation constant β11, the FBG 451a reflects not only the optical signal being in the fundamental mode having the wavelength λ1 but also the optical signal being in the high order mode having the wavelength different from λ1. If these reflected optical signals are extracted to be received by a photo diode, crosstalk between the received signals deteriorates. In the present embodiment, in order to prevent the crosstalk between the received signals from deteriorating, the wavelengths of the light sources (i.e., laser diodes 101 to 10x) are set as follows. For example, in the case where wavelength multiplexing of the optical signals having the wavelengths λ1 and λ2 is performed, the wavelengths λ1 and λ2 are set such that a propagation constant of a high order mode of the optical signal having the wavelength λ1 does not coincide with a propagation constant of the fundamental mode of the optical signal having the wavelength λ2.

To be specific, in the case where βmx is a propagation constant of a mth mode occurring when the optical signal having the wavelength λx propagates through a multimode optical fiber, the wavelengths λ1 and λ2 are set such that an equation (1) is satisfied. Here, m is an integer number equal to 1 or greater. In other words, the wavelengths λ1 and λ2 are set such that the propagation constant of the fundamental mode having the wavelength λ2 does not coincide with the propagation constant of the high order mode having the wavelength λ1. In particular, by setting the wavelengths λ1 and λ2 such that an equation (2) is satisfied, crosstalk occurring between the optical signals respectively having the wavelengths λ1 and λ2 is minimized.

$$\beta m1 > \beta 12 > \beta (m+1)1 \tag{1}$$

$$\beta 12 = (\beta m1 + \beta (m+1)1)/2 \tag{2}$$

Note that, the propagation constant βmx of the optical signal propagating through an optical fiber is approximately represented by equations (3) to (6). Here, a mode number of the optical signal having the wavelength λx is denoted as N(λx), a normalized frequency of the optical fiber is denoted as ν, a relative refractive index difference of the optical fiber is denoted as Δ, a refractive index of a core of the optical fiber is denoted as $n_1$, a refractive index of the cladding of the optical fiber is denoted as $n_0$, a core diameter of the optical fiber is denoted as r, and a refractive index distribution profile of the core of the optical fiber is denoted as α.

$$\beta mx = \frac{2\pi}{\lambda x} \cdot n_1 \cdot \sqrt{1 - 2\Delta \left(\frac{m}{N(\lambda x)}\right)^{\frac{\alpha}{\alpha+2}}} \tag{3}$$

$$N(\lambda x) = \frac{\alpha}{\alpha+2} \cdot \frac{v^2}{2} \tag{4}$$

$$v = \frac{2\pi}{\lambda x} \cdot n_1 \cdot r \cdot \sqrt{2\Delta} \tag{5}$$

$$\Delta = \frac{n_1^2 - n_0^2}{2 \cdot n_1^2} \tag{6}$$

Only the optical signals of the wavelengths λ1 and λ2 are described above. However, also in the case where there exist more than two wavelengths in the multimode optical transmission system, the wavelengths of optical signals respectively outputted from the light sources are set in the above described manner. To be specific, in the multimode optical transmission system, wavelengths of optical signals respectively outputted from the light sources are set, such that a propagation constant of a fundamental mode of each optical signal does not coincide with a propagation constant of a high order mode of any other optical signal. By setting the wavelengths of the light sources in such a manner, a wavelength multiplexing transmission can be performed without deteriorating a quality of an optical transmission, even if the multimode transmission path is used for the wavelength multiplexing transmission.

In the multimode optical transmission system, a propagation constant of the optical fiber may be changed by adjusting any of the parameters of the optical fiber, so that a propagation constant of a fundamental mode of each optical signal does not coincide with a propagation constant of a high order mode of any other optical signal.

Further, in the multimode optical transmission system, if a propagation constant of a fundamental mode of an optical signal is similar to a propagation constant of a high order mode of any other optical signal, reflection bandwidths of the FBGs 451a to 45xa may be adjusted so that only the fundamental mode of the optical signal may be extracted.

Although described above is the case where the mode processing section 400 extracts only the fundamental mode of the wavelength multiplexed signal, a mode extracted by the mode processing section 400 is not limited to only the fundamental mode.

Instead of the circulators 411a to 41xa, photocouplers may be used as the reflected optical signal extraction sections 411 to 41x. Instead of the FBG 451a to 451xa, optical filters may be used as the optical reflection sections 451 to 45x, the optical filters each for transmitting an optical signal being in a mode having a particular wavelength and a particular propagation constant and reflecting any other optical signals.

In the case where short-wavelength light sources are used as the light sources 101 to 10x, a single mode optical fiber may be used as the multimode optical transmission path 300. When an optical signal having a wavelength shorter than a cutoff wavelength of the single mode optical fiber enters and propagates through the single mode optical fiber, a plurality of propagation modes occur in the optical signal. For example, since a cutoff wavelength of a widely prevalent 1.31 µm zero-dispersion single-mode optical fiber (SMF) is approximately 1.2 µm, if 0.85 µm short-wavelength light sources are used as the light sources 101 to 10x, the plurality of propagation modes occur in the optical signal propagating through the single mode optical fiber. In general, a cost of the short-wavelength light source is less expensive than that of a long-wavelength light source. Therefore, by combining the SMF and the short-wavelength light sources, a cost for constructing the entire system can be reduced compared with the conventional system in which the SMF and the long-wavelength light sources are used.

Instead of using the multimode optical fiber or the single mode optical fiber as the multimode optical transmission path 300, the path 300 may be a free space having a plurality of propagation paths.

As described above, in the optical transmission system according to the first embodiment of the present invention, an optical signal in a particular mode can be extracted from an optical signal having a plurality of modes. As a result, the deterioration of the quality of the optical signal having the plurality of modes, which is caused by multimode dispersion, can be reduced, the multimode dispersion occurring when the square-law detection is performed on the optical signal having a plurality of modes. Moreover, a deterioration of received signals caused by the crosstalk between the received signals can be prevented, by setting wavelengths of optical signals respectively outputted from the plurality of light sources such that a propagation constant of a fundamental mode of an optical signal outputted from each light source does not coincide with a propagation constant of a high order mode of an optical signal outputted from any other light source.

Second Embodiment

Figure 5:
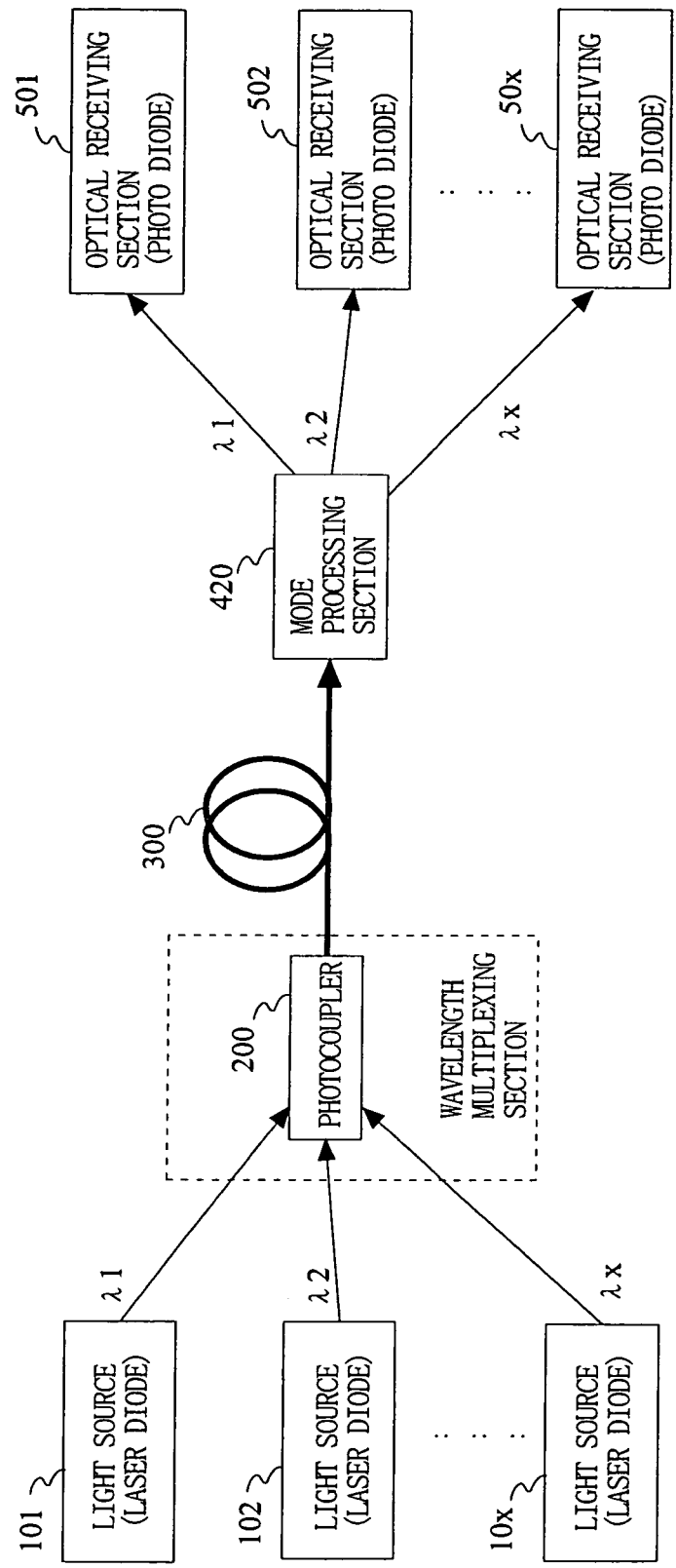
FIG. 5 is a block diagram showing a fundamental structure of a multimode optical transmission system according to a second embodiment of the present invention.

FIG. 5 is a block diagram showing a fundamental structure of a multimode optical transmission system according to a second embodiment of the present invention. In FIG. 5, the multimode optical transmission system according to the second embodiment is same as the multimode optical transmission system according to the first embodiment, except that the mode processing section 420 of the multimode optical transmission system according to the second embodiment is different from the mode processing section 400 according to the first embodiment. The mode processing section 400 according to the first embodiment extracts an optical signal having only one mode (i.e., fundamental mode) from a single-wavelength optical signal. On the other hand, the mode processing section 420 according to the second embodiment is capable of extracting an optical signal having a plurality of modes from the single-wavelength optical signal, thereby minimizing optical loss resulting from mode processing.

Figure 6:
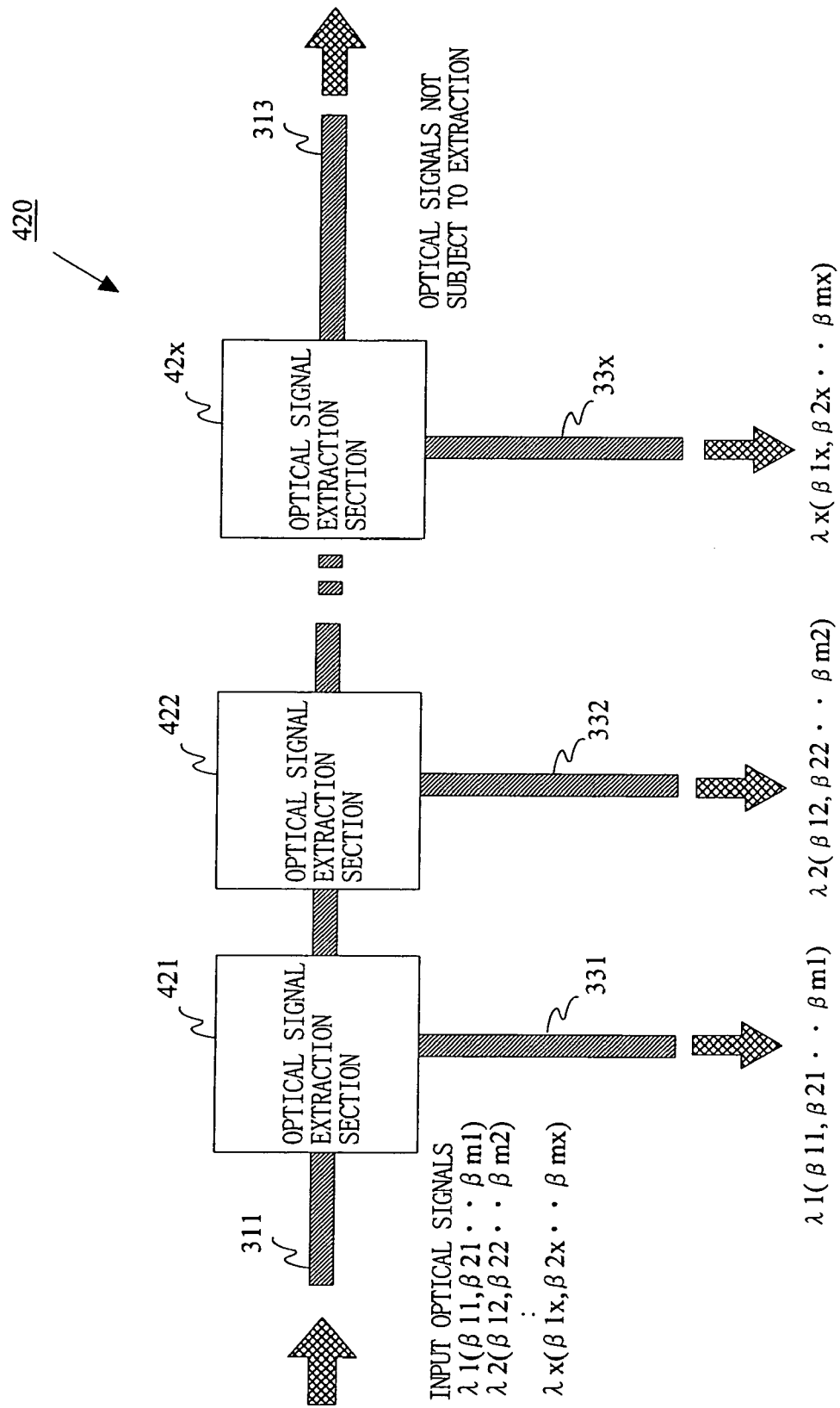
FIG. 6 is a block diagram showing a schematic structure of a mode processing section 420 according to the second embodiment of the present invention.

FIG. 6 is a block diagram showing a schematic structure of the mode processing section 420 according to the second embodiment of the present invention. As shown in FIG. 6, the mode processing section 420 includes optical signal extraction sections 421 to 42x, the input optical transmission path 311, the output optical transmission path 313 and the output optical transmission paths 331 to 33x. Each of the optical signal extraction sections 421 to 42x extracts, from a corresponding one of optical signals respectively having the wavelengths λ1 to λx, an optical signal having a plurality modes.

Figure 7:
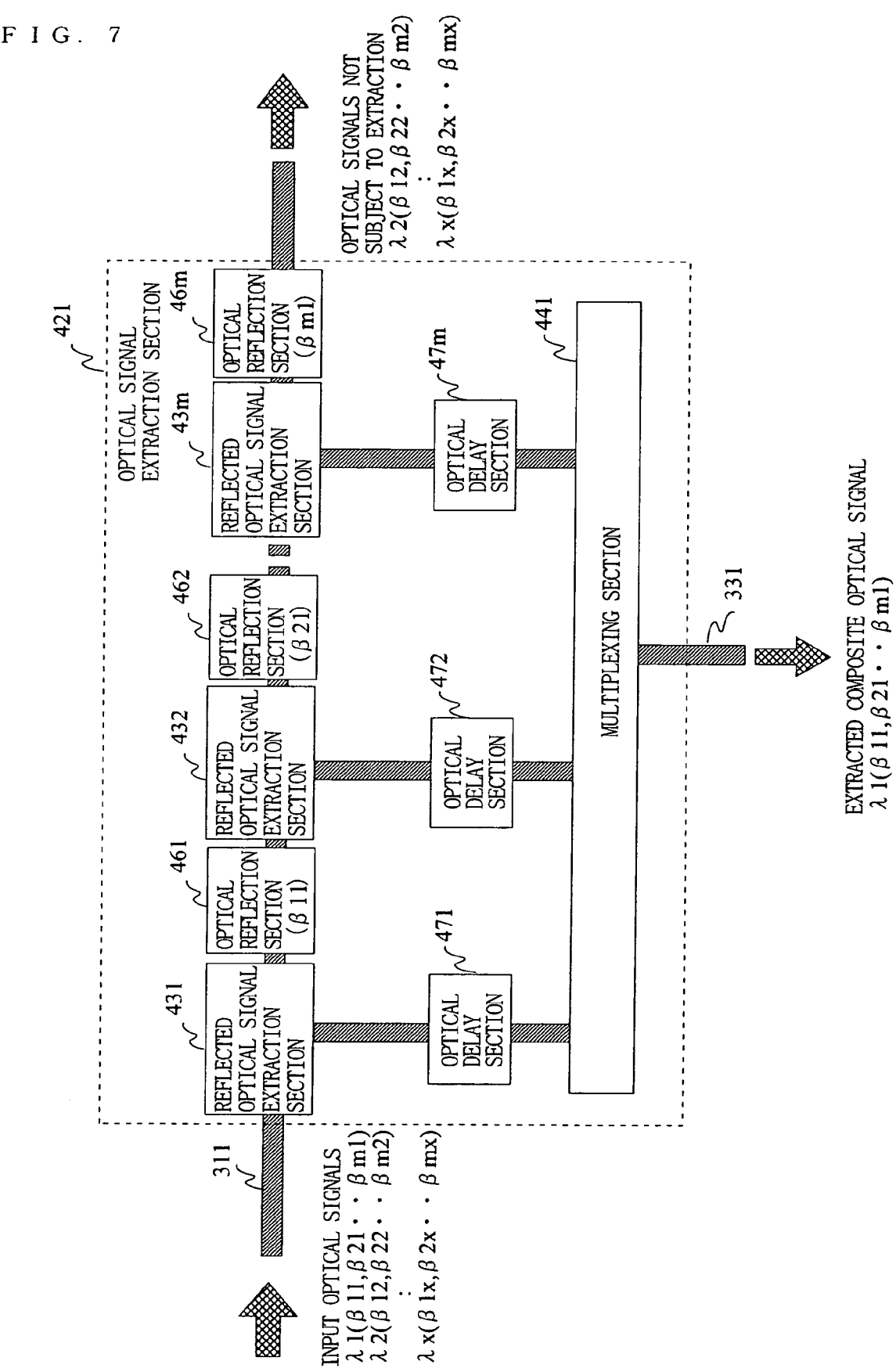
FIG. 7 is a block diagram showing an exemplary structure of an optical signal extraction section 421 according to the second embodiment of the present invention.
Figure 8:
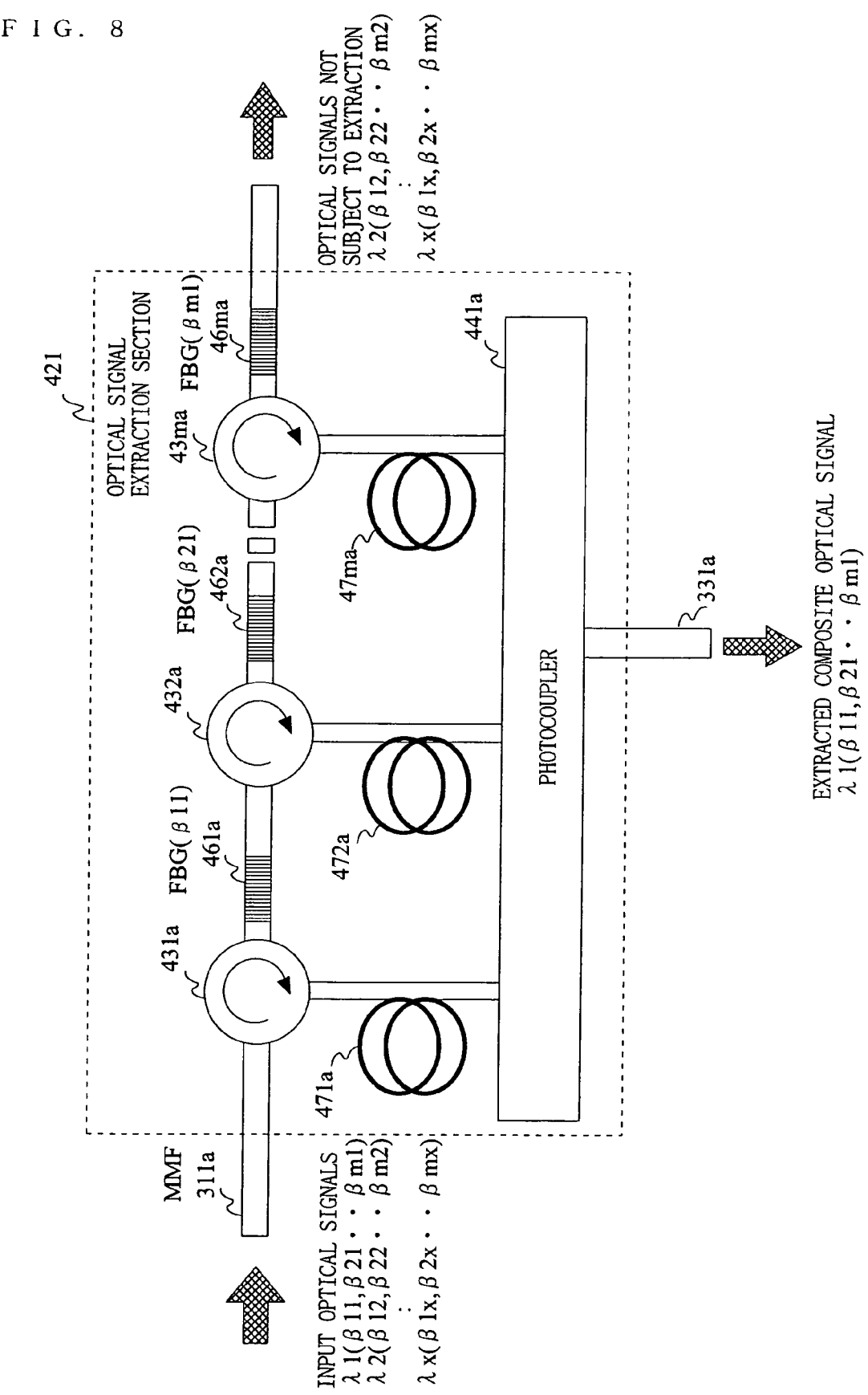
FIG. 8 is a block diagram showing a detailed exemplary structure of the optical signal extraction section 420 according to the second embodiment of the present invention.
Figure 9:
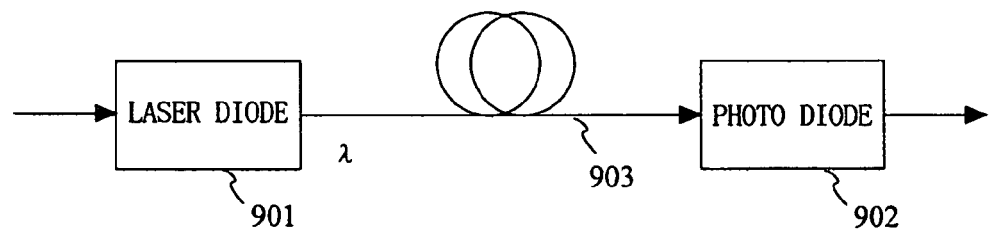
FIG. 9 is a block diagram showing a structure of a conventional multimode optical transmission system.
Figure 10:
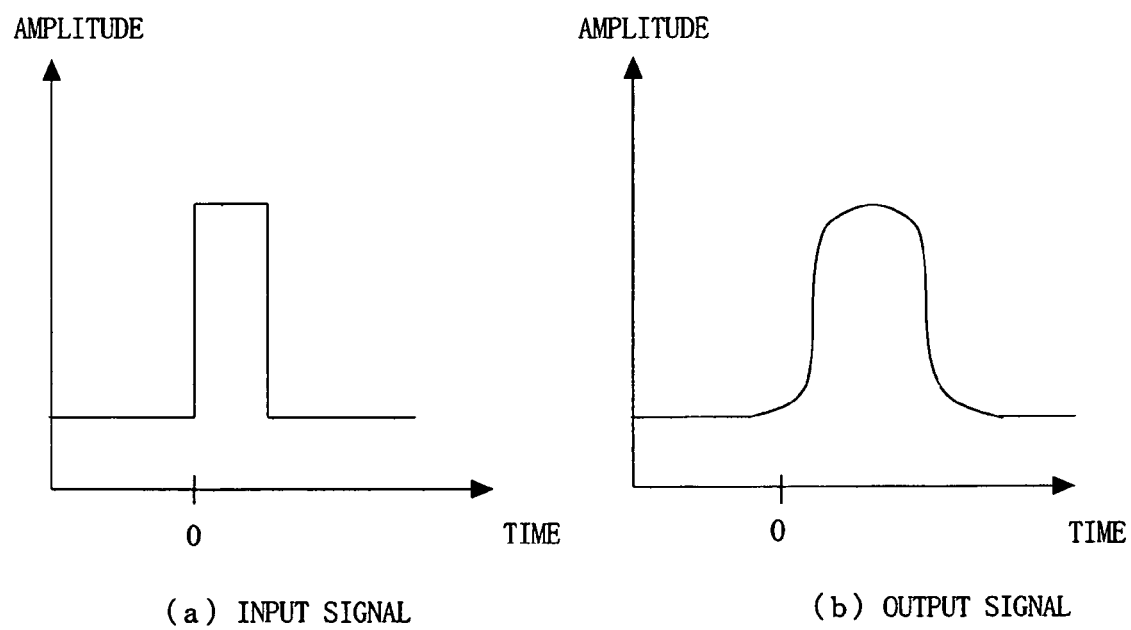
FIG. 10 illustrates a relationship between an input signal and an output signal in the conventional multimode optical transmission system.

Here, the optical signal extraction sections 421 to 42x are described in detail with reference to FIGS. 7 and 8. FIG. 7 is a block diagram showing a structural example of the optical signal extraction section 421 according to the second embodiment of the present invention. As shown in FIG. 7, the optical signal extraction section 421 includes reflected optical signal extraction sections 431 to 43m, optical reflection sections 461 to 46m, optical delay sections 471 to 47m, a multiplexing section 441, and the output optical transmission path 331. FIG. 8 is a block diagram showing a detailed exemplary structure of the optical signal extraction section 421 according to the second embodiment of the present invention. In FIG. 8, the optical signal extraction section 421 illustratively includes: the circulators 431a to 43ma as the reflected optical signal extraction sections 431 to 43m; FBGs 461 to 46ma as the optical reflection sections 461 to 46m; optical delay lines 471a to 47ma as the optical delay sections 471 to 47m, the optical delay lines being, e.g., optical fibers; a photocoupler 441a as the multiplexing section 441; and an optical fiber 331a as the output optical transmission path 331.

With reference to FIG. 8, the optical signal extraction section 421 extracts an optical signal having a plurality of modes from the optical signal having the wavelength λ1. To be specific, the optical signal inputted into the MMF 311a is inputted into the FBG 461a via the circulator 431a. The FBG 461a is designed to reflect an optical signal being in a mode having the propagation constant $\beta 11$. Accordingly, only the optical signal being in the mode having the propagation constant $\beta 11$ is inputted into the optical delay line 471a via the circulator 431a. Optical signals other than the optical signal being in the mode having the propagation constant $\beta 11$ are inputted into the FBG 462a via the FBG 461a and the circulator 432a. Similarly, optical signals respectively being in modes respectively having propagation constants $\beta 21$ to $\beta m1$ are respectively reflected by the FBG 462a to FBG 46ma, and are respectively inputted into the optical delay lines 472a to 47ma. The optical delay lines 472a to 47ma respectively give appropriate delays to the optical signals respectively being in the modes respectively having the propagation constant $\beta 21$ to $\beta m1$, thereby adjusting propagation delays of all the modes to a same amount. All the optical signals, each of which is in a mode whose propagation delay has been adjusted to the same amount, are coupled by the photocoupler 441a, and then outputted from the optical fiber 331a.

The optical signal extraction section 421 may include, instead of the reflected optical signal extraction sections 431 to 43m and the optical reflection sections 461 to 46m, a plurality of optical filters each for transmitting an optical signal being in a particular mode having a particular wavelength and a particular propagation constant and reflecting any other optical signals.

In the above description, delay processing and multiplexing processing of optical signals are performed in an optical region. However, the delay processing and multiplexing processing may be performed in an electrical region after converting the optical signals into electrical signals.

As described above, in the multimode optical transmission system according to the second embodiment of the present invention, each of the optical signal extraction sections 421 to 42x includes a plurality of optical reflection sections 461 to 46m, a plurality of reflected optical signal extraction sections 431 to 43m and a plurality of optical delay sections 471 to 47m. For this reason, each of the optical receiving sections 501 to 50x can collectively perform the square-law detection on optical signals respectively being in a plurality of modes each having the same amount of total propagation delay. Consequently, the multimode optical transmission system according to the present embodiment not only reduces the deterioration of the quality of the optical transmission caused by the multimode dispersion but also minimizes optical transmission loss resulting from a mode extraction.

INDUSTRIAL APPLICABILITY

The multimode optical transmission system of the present invention is useful as a system for performing a multimode transmission of an optical signal.

The invention claimed is:

1. A multimode optical transmission system for converting electrical signals into optical signals and performing multimode optical transmission of the optical signals, the multimode optical transmission system comprising:
   a plurality of light sources for converting a plurality of electrical signals into a plurality of optical signals having different wavelengths corresponding to the plurality of electrical signals, and outputting the plurality of optical signals;
   a wavelength multiplexing section for multiplexing the plurality of optical signals outputted from the plurality of light sources and outputting a wavelength multiplexed signal;
   a multimode optical transmission path for optically transmitting, in multimode, the wavelength multiplexed signal outputted from the wavelength multiplexing section;
   a plurality of optical signal extraction sections for extracting, from the wavelength multiplexed signal transmitted on the multimode optical transmission path, a plurality of optical signals, corresponding to the plurality of optical signal extraction sections, wherein each of the plurality of optical signals has a mode with a particular wavelength and a particular propagation constant; and
   a plurality of optical receiving sections for receiving the plurality of optical signals extracted by the plurality of optical signal extraction sections and converting the plurality of optical signals into a corresponding plurality of electrical signals, wherein
   a wavelength of each of the plurality of optical signals outputted from the plurality of light sources is set such that a propagation constant of a fundamental mode of an optical signal, having a particular wavelength, outputted from each of the plurality of light sources is different from a propagation constant of a high order mode of an optical signal, having a different wavelength, outputted from any other of the plurality of light sources.

2. The multimode optical transmission system according to claim 1, wherein the plurality of optical signal extraction sections each comprise:
   an optical reflection section for reflecting one of the plurality of optical signals having the mode with the particular wavelength and the particular propagation constant for reflection, and
   a reflected optical signal extraction section for extracting the optical signal reflected by the optical reflection section.

3. The multimode optical transmission system according to claim 1, wherein the plurality of optical signal extraction sections each comprise:
   a plurality of optical reflection sections, corresponding to the plurality of optical signals, for reflecting the plurality of optical signals, with each of the plurality of optical signals having a mode with a particular wavelength and a particular propagation constant for reflection by the optical reflection section corresponding to the optical signal,
   a plurality of reflected optical signal extraction sections, corresponding to the plurality of optical reflection sections, for extracting the optical signals reflected by the plurality of optical reflection sections,
   a plurality of optical delay sections, corresponding to the plurality of reflected optical signal extraction sections, for adding appropriate delays to the optical signals extracted by the plurality of reflected optical signal extraction sections, and
   a multiplexing section for multiplexing the optical signals outputted via the plurality of optical delay sections.

4. The multimode optical transmission system according to claim 1, wherein each of the plurality of optical signal extraction sections is an optical filter for transmitting one of the plurality of optical signals having the mode with the particular wavelength and the particular propagation constant for transmission and reflecting any other optical signals.

5. The multimode optical transmission system according to claim 1, wherein the plurality of optical signal extraction sections each comprise:
   a plurality of optical filters, corresponding to the plurality of optical signals, for transmitting the plurality of optical signals, with each of the plurality of optical signals having a mode with a particular wavelength and a particular propagation constant for transmission through the optical filter corresponding to the optical signal, and reflecting any other optical signals,
   a plurality of optical delay sections, corresponding to the plurality of optical filters, for adding appropriate delays to the optical signals transmitted through the plurality of optical filters, and
   a multiplexing section for multiplexing the optical signals outputted via the plurality of optical delay sections.

6. The multimode optical transmission system according to claim 1, wherein the multimode optical transmission path is a multimode optical fiber.

7. The multimode optical transmission system according to claim 1, wherein
   the multimode optical transmission path is a single mode optical fiber, and
   a wavelength of an optical signal propagating through the single mode optical fiber is smaller than a cutoff frequency of the single mode optical fiber.

8. The multimode optical transmission system according to claim 1, wherein the multimode optical transmission path is a free space having a plurality of transmission paths.

9. The multimode optical transmission system according to claim 2, wherein the optical reflection section is a Fiber Bragg Grating.

10. The multimode optical transmission system according to claim 2, wherein the optical reflection section is an optical filter for transmitting one of the plurality of optical signals having the mode with the particular wavelength and the particular propagation constant for transmission and reflecting any other optical signals.

11. The multimode optical transmission system according to claim 2, wherein the reflected optical signal extraction section is an optical circulator.

12. The multimode optical transmission system according to claim 2, wherein the reflected optical signal extraction section is a photocoupler.

13. The multimode optical transmission system according to claim 3, wherein the plurality of optical delay sections are a plurality of optical waveguides.

14. The multimode optical transmission system according to claim 3, wherein the plurality of optical delay sections each adjust a delay amount by changing a refractive index of an optical transmission path.

15. A multimode optical transmission method for converting inputted electrical signals into optical signals, and performing multimode optical transmissions of the optical signals, the multimode optical transmission method comprising:

a light outputting step of converting a plurality of electrical signals into a plurality of optical signals having different wavelengths corresponding to the plurality of electrical signals, and outputting the plurality of optical signals;

a wavelength multiplexing step of multiplexing the plurality of optical signals outputted in the light outputting step and outputting a wavelength multiplexed signal;

an optical transmission step of optically transmitting, in multimode via a multimode optical transmission path, the wavelength multiplexed signal outputted in the wavelength multiplexing step;

an optical signal extracting step of extracting, from the wavelength multiplexed signal transmitted via the multimode optical transmission path, a plurality of optical signals, wherein each of the plurality of optical signals has a mode with a particular wavelength and a particular propagation constant; and a light receiving step of receiving the plurality of optical signals extracted in the optical signal extracting step and converting the plurality of optical signals into a corresponding plurality of electrical signals, wherein a wavelength of each of the plurality of optical signals outputted in the light outputting step is set such that a propagation constant of a fundamental mode of an optical signal, having a particular wavelength, outputted from each of the plurality of light sources is different from a propagation constant of a high order mode of an optical signal, having a different wavelength, outputted from any other of the plurality of light sources.

* * * * *